US011609562B2

(12) United States Patent
Kean et al.

(10) Patent No.: US 11,609,562 B2
(45) Date of Patent: Mar. 21, 2023

(54) USING GENERATED MARKINGS FOR VEHICLE CONTROL AND OBJECT AVOIDANCE

(71) Applicant: Deere & Company, Moline, IL (US)

(72) Inventors: Michael G. Kean, Maquoketa, IA (US); Amy K. Jones, Dubuque, IA (US); Brett S. Graham, Dubuque, IA (US); Nathaniel M. Czarnecki, Bettendorf, IA (US); Gordon E. Miller, Dubuque, IA (US); Rachel Bruflodt, Dubuque, IA (US)

(73) Assignee: Deere & Company, Moline, IL (US)

( * ) Notice: Subject to any disclaimer, the term of this patent is extended or adjusted under 35 U.S.C. 154(b) by 12 days.

(21) Appl. No.: 16/859,033

(22) Filed: Apr. 27, 2020

(65) Prior Publication Data

US 2021/0333790 A1 Oct. 28, 2021

(51) Int. Cl.
*G05D 1/00* (2006.01)
*B60W 60/00* (2020.01)
(Continued)

(52) U.S. Cl.
CPC ........... *G05D 1/0016* (2013.01); *B60W 10/04* (2013.01); *B60W 10/20* (2013.01); *B60W 60/0025* (2020.02); *G01C 21/3461* (2013.01); *G05D 1/0214* (2013.01); *G05D 1/0234* (2013.01); *G05D 1/0251* (2013.01); *G05D 1/0253* (2013.01); *G05D 2201/0201* (2013.01);
(Continued)

(58) Field of Classification Search
CPC .......... G05D 1/16; G05D 1/214; G05D 1/234; G05D 1/251; G05D 1/253; G05D 2201/202; G05D 2201/216; B60W 60/25; B60W 10/04; B60W 10/20; G01C 21/3461
See application file for complete search history.

(56) References Cited

U.S. PATENT DOCUMENTS 10,126,755 B1 * 11/2018 Lavi ......................... B60D 1/62
2014/0297135 A1 * 10/2014 Larsson ..................... B60T 7/22
701/50
(Continued)

FOREIGN PATENT DOCUMENTS

DE  102019203300 A1  10/2019
DE  102019212322 A1  2/2020
DE  102020109276 A1  10/2020

OTHER PUBLICATIONS

Bobcat Launches "Next is Now" Campaign Sep. 20, 2019. By Walt Moore. https://www.constructionequipment.com/bobcat-launches-next-now-campaign?eid=408939723&bid=2528398, 3 pages.
(Continued)

*Primary Examiner* — Jess Whittington
*Assistant Examiner* — Terry C Buse
(74) *Attorney, Agent, or Firm* — Joseph R. Kelly; Kelly, Holt & Christenson, PLLC

(57) ABSTRACT

A work machine has a backup camera that captures images of an area of a worksite behind the work machine. A controller identifies pre-defined markings in the worksite and localizes the pre-defined markings to the work machine, based on the images. A control signal generator generates control signals to automatically control the work machine based upon the localized markings.

20 Claims, 14 Drawing Sheets

(51) Int. Cl.
*B60W 10/20* (2006.01)
*B60W 10/04* (2006.01)
*G05D 1/02* (2020.01)
*G01C 21/34* (2006.01)

(52) U.S. Cl.
CPC .............. *G05D 2201/0202* (2013.01); *G05D 2201/0216* (2013.01)

(56) References Cited

U.S. PATENT DOCUMENTS

| | | | |
|---|---|---|---|
| 2016/0311465 A1* | 10/2016 | Friend | G01B 7/30 |
| 2017/0088147 A1* | 3/2017 | Tentinger | B60K 35/00 |
| 2019/0009181 A1* | 1/2019 | Kroyan | A63H 3/28 |
| 2019/0039577 A1* | 2/2019 | Nishimura | F16H 63/46 |
| 2019/0129419 A1* | 5/2019 | Lee | G05D 1/0263 |
| 2020/0255032 A1* | 8/2020 | Wiklander | G05D 1/0291 |
| 2021/0311472 A1* | 10/2021 | Kleen | G05D 1/0212 |
| 2022/0026587 A1* | 1/2022 | Hayakawa | E02F 9/265 |

OTHER PUBLICATIONS

German Search Report issued in application No. DE102021202030.5 dated Oct. 5, 2021 (07 pages).

* cited by examiner

USING GENERATED MARKINGS FOR VEHICLE CONTROL AND OBJECT AVOIDANCE

FIELD OF THE DESCRIPTION

The present description relates to controlling a work machine. More specifically, the present description relates to controlling a work machine based on pre-generated markings that are recognized by the work machine.

BACKGROUND

There are many different types of mobile work machines, including machines such as skid steer loaders and compact track loaders. There are other types of work machines that include agricultural, forestry, construction and turf management machines, among others.

In operating such work machines, it is not uncommon for an operator to split his or her attention between controlling an attachment on the work machine, and navigating the work machine.

For example, a skid steer loader may be fitted with a trenching attachment. The operator then operates the skid steer loader, often in reverse, to dig a trench along a desired trenching route. In order to do so, the operator must normally split his or her attention between providing operator inputs to control the trencher attachment (while looking forward on the machine) and navigating the machine along the desired trenching route (while looking rearward on the machine).

The discussion above is merely provided for general background information and is not intended to be used as an aid in determining the scope of the claimed subject matter.

SUMMARY

A work machine has a backup camera that captures images of an area of a worksite behind the work machine. A controller identifies pre-defined markings in the worksite and localizes the pre-defined markings to the work machine, based on the images. A control signal generator generates control signals to automatically control the work machine based upon the localized markings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for the operator of a work machine (such as a skid steer loader or a compact track loader) to be operating an attachment in order to perform a work operation. In such scenarios, it is not uncommon for the operator to need to split his or her attention between controlling the attachment, and navigating the work machine.

There are a wide variety of different scenarios where this can occur. In many of these scenarios, the work machine is traveling in a reverse direction, while the operator is controlling the attachment. This means that the operator needs to focus on controlling the attachment to perform the work operation, as well as navigate the work machine, in the reverse direction. When the attachment is mounted to the front of the work machine, this can cause the operator to focus his or her attention in two different directions (forward to operate the attachment and rearward to navigate the machine).

The present description thus proceeds with respect to a work machine that has a backup camera. Prior to performing a work operation with the mobile work machine (or vehicle), the operator assesses the worksite and applies paint, tape, or other marking material to the worksite. The operator can then enter the machine and begin operation. The backup camera captures images of the worksite, behind the machine and an image processor identifies the markings (in the captured images) that were placed in the worksite by the operator. Those markings are used in automatically controlling the machine.

For instance, when the work machine is to follow a predetermined route (such as in a trenching operation) the operator can put down tape or paint along the predetermined trenching route. The backup camera can then capture images that include the tape or paint line (with predefined optical characteristics), and this marking can be used to automatically control navigation of the machine to follow the line, while the operator is controlling the trenching attachment. A similar travel control operation can be used in performing a fencing operation or other similar types of operations, such as cold planting, etc. The operator can control the attachment while the machine is automatically controlled to follow a pre-marked route.

In another example, the operator may be performing landscaping operations within a worksite area. The operator can locate objects, such as trees, boulders, fences, etc., and mark exclusion zones by surrounding those objects with the tape or paint (or other marking material). The backup camera can then capture images that include those markings and automatically control the machine to avoid impinging on the exclusion zones. These and other examples are contemplated herein.

Figure 1:
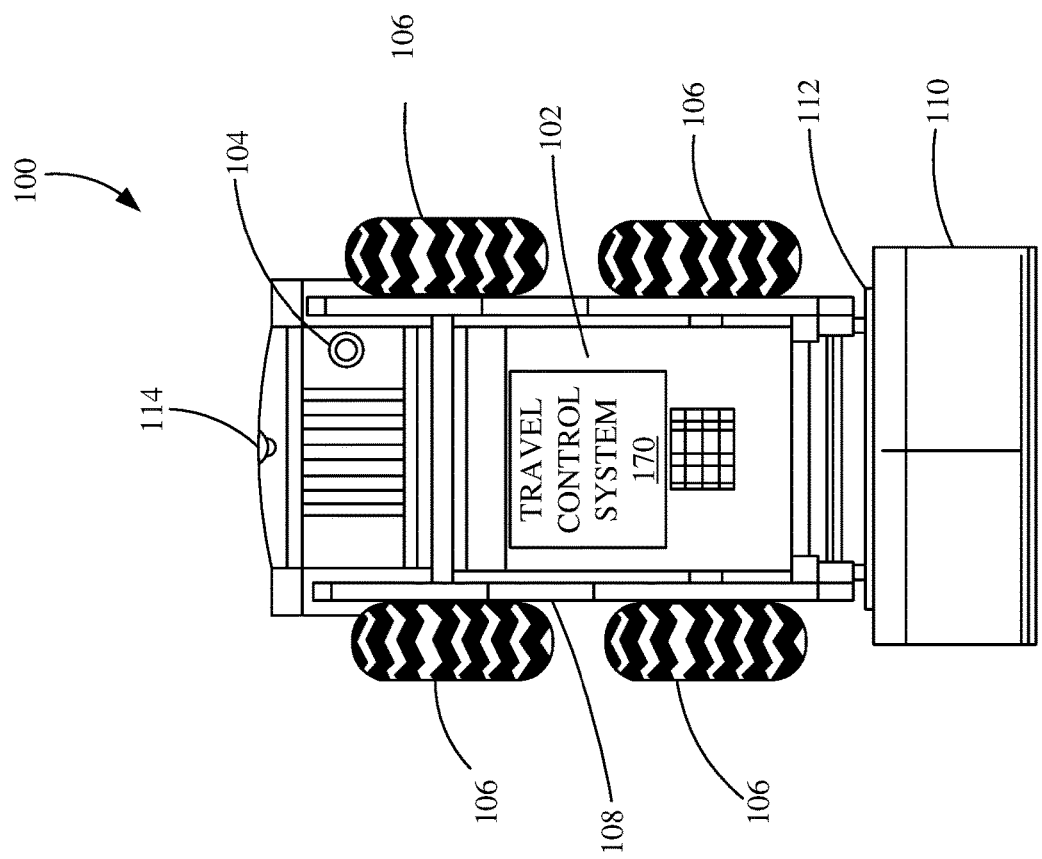
FIG. 1 is a top pictorial illustration of an example in which a work machine is a skid steer loader.

FIG. 1 is a top view of an example in which a mobile work machine is a skid steer loader 100. Skid steer loader 100 illustratively includes an operator compartment 102 and an engine compartment 104. Engine 104 illustratively powers a hydraulic system that drives a propulsion subsystem, such as hydraulic motors, which, themselves, drive ground engaging elements, such as wheels 106. It will be appreciated, that the ground engaging elements 106 can be tracks or other ground engaging elements as well.

The hydraulic system also illustratively powers hydraulic actuators (e.g., cylinders) that control the raising and lowering of a lift arm 108. Lift arm 108 can be coupled, at its front end, to an attachment 110 by an attachment mechanism 112. In the example shown in FIG. 1, attachment 110 is a bucket. Thus, an operator can provide an input through operator interface mechanisms in order to control lift and tilt cylinders so as to control the orientation and position of bucket 110 relative to the frame of machine 100.

Also, in the example shown in FIG. 1, loader 100 illustratively incudes a backup camera 114. Backup camera 114 can be a mono camera, a stereo camera, or a set of one or more other image capture (or video capture) devices. Loader 100 also includes a travel control system 170 which uses the captured images to perform automatic travel control operations with loader 100. Some examples of these operations are described below.

Figure 2:
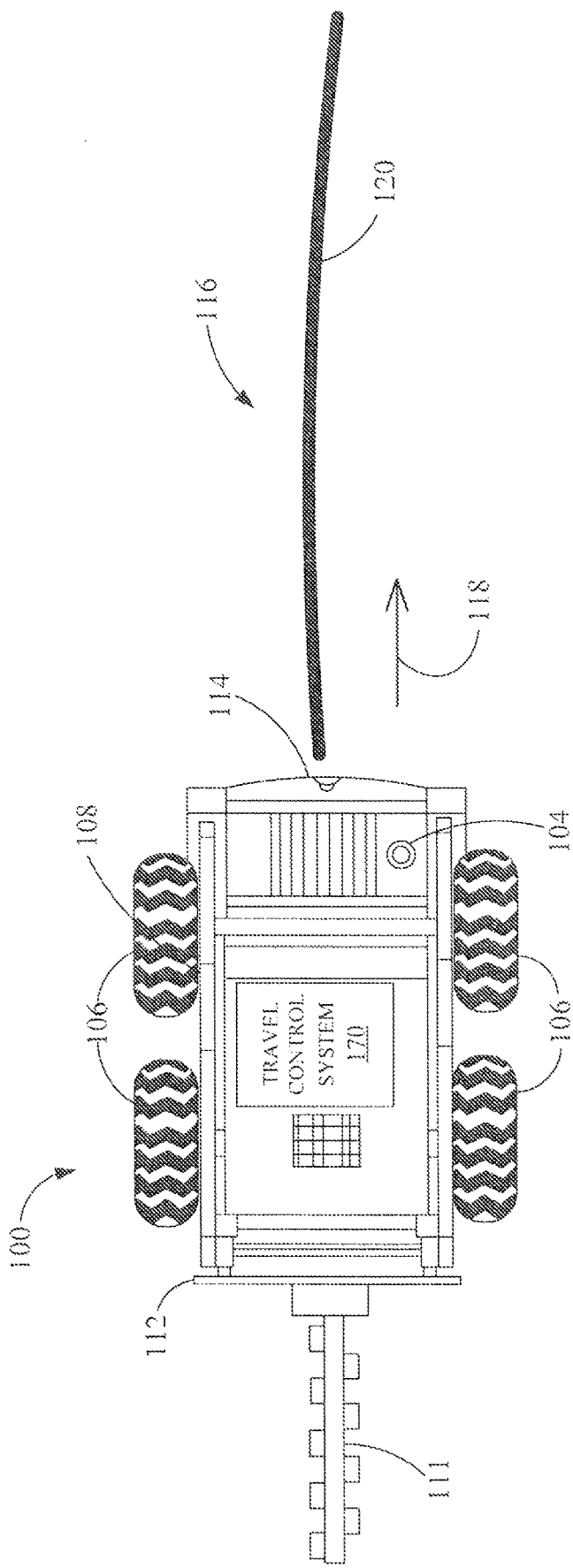
FIG. 2 is a top view of a skid steer loader performing a trenching operation.

FIG. 2 shows an example in which skid steer loader 100 is performing a trenching operation. Some items in FIG. 2 are similar to those shown in FIG. 1, and they are similarly numbered. In the example shown in FIG. 2, loader 100 has a trencher attachment 111 attached to the attachment mechanism 112. An operator in operator compartment 102 controls a hydraulic motor (or other actuator) to drive rotation of trencher 111. In the example shown in FIG. 2, the operator is to perform a trenching operation along trenching route 116. Therefore, it is not uncommon for the operator to control loader 100 so that it moves in the reverse direction, indicated by arrow 118, so that trencher 111 is performing a trenching operation along the trenching route 116. This means that the operator often needs to split his or her attention between looking forward to control trencher 111, and looking rearward to navigate loader 100 along the trenching route 116.

Thus, in one example described herein, the operator, before beginning the trenching operation, applies tape or paint or other marking material 120 along trenching route 116. The operator then orients machine 100 so that backup camera 114 has at least a portion of the marking material within its field of view. The travel control system 170 (described in greater detail below) then processes images captured by backup camera 114 and generates control signals to automatically navigate skid steer loader 100 so that it follows the trenching route 116.

Figure 3:
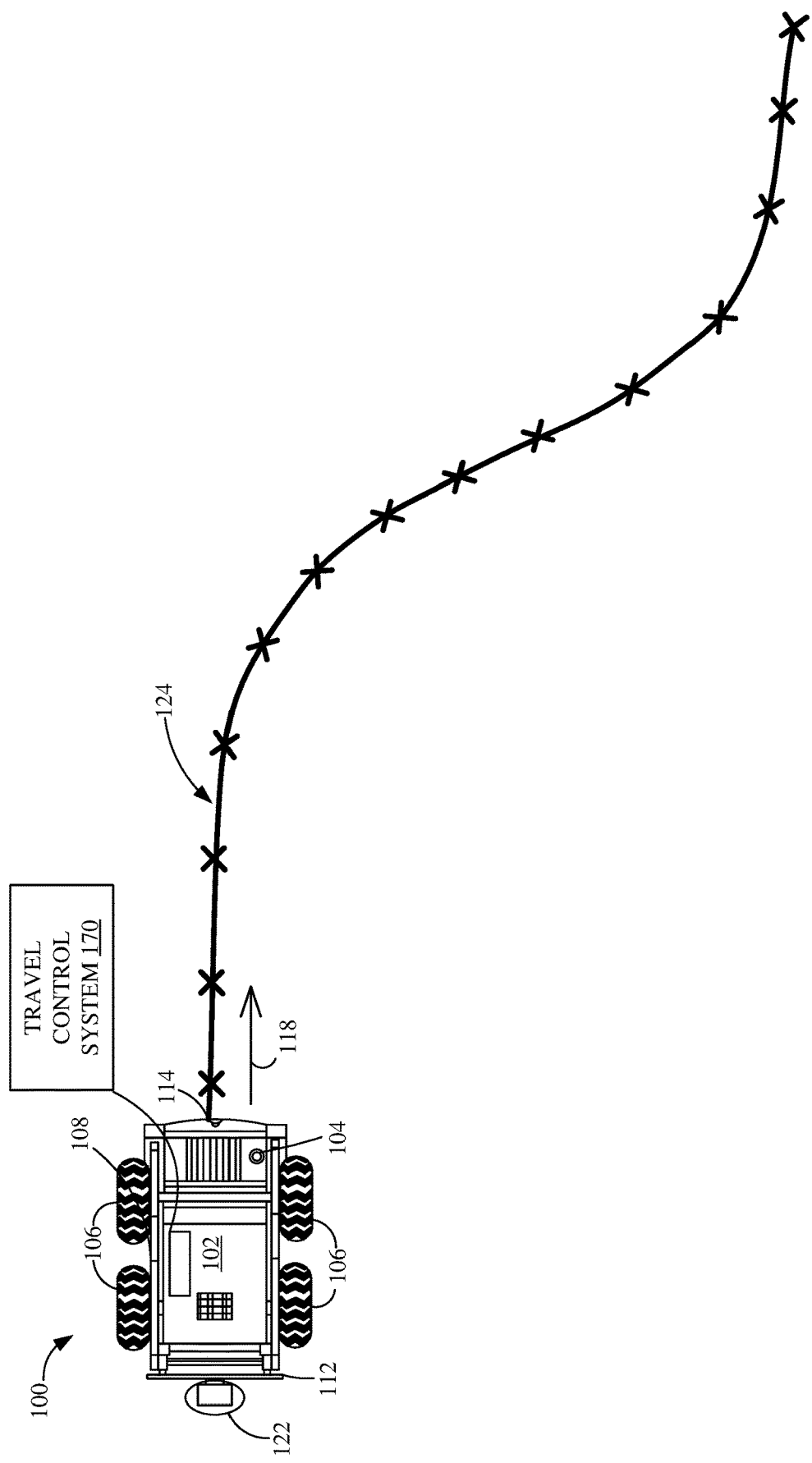
FIG. 3 is a top view of a skid steer loader performing a fencing operation.

FIG. 3 is similar to FIG. 2, and similar items are similarly numbered. However, FIG. 3 shows that skid steer loader 100 is now fitted with an auger attachment, or post hole digger 122. Thus, the operator in operator compartment 102 controls hydraulic motors or other actuators to control the position and rotation of auger 112. In the example shown in FIG. 3, the operator is to perform a fencing operation in which post holes are to be drilled at post hole locations, marked by Xs, along a fencing route 124. Thus, as is described in greater detail below, the operator first illustratively provides marking material to mark the fencing route 124. The operator then orients loader 100 so that at least a portion of the marked fencing route 124 is within the field of view of backup camera 114. The travel control system 170 then processes images captured by backup camera 114 so that loader 100 is automatically controlled to follow the marked fencing route 124. In one example, the post holes are dug at a known linear distance interval along route 124 (e.g., the post hole locations are spaced from one another along route 124 by a fixed, predefined distance). Thus, the operator can provide an indication of that fixed distance to the travel control system 170. Then, the travel control system 170 controls loader 100 so that it automatically travels the indicated distance along route 124, and then stops so that the next post hole can be dug using auger 122.

Figure 4:
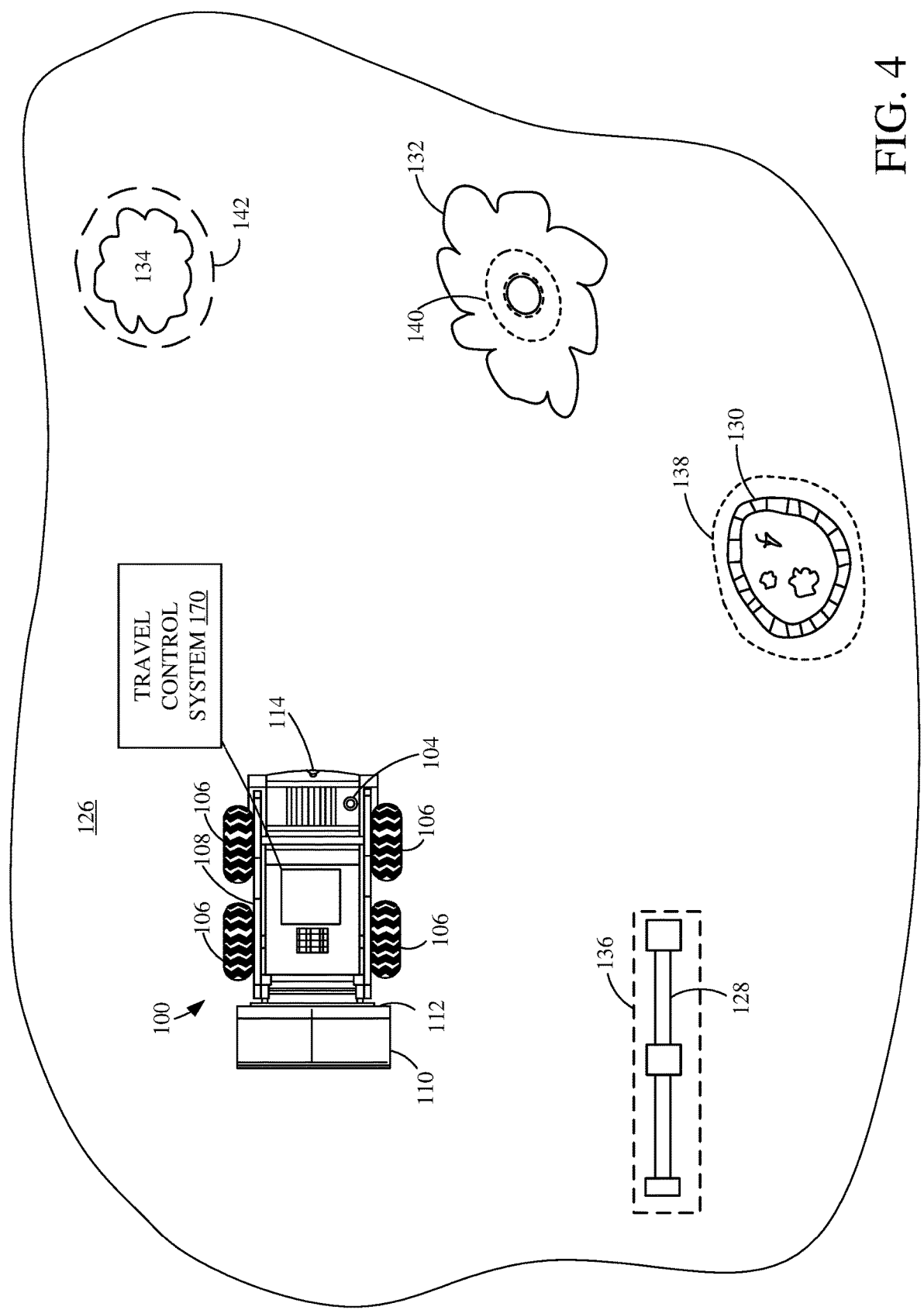
FIG. 4 is a top view of a skid steer loader performing a landscaping operation.

FIG. 4 shows another example in which loader 100 is being used to perform landscaping operations within a worksite 126. Again, some items in FIG. 4 are similar to those items shown in previous figures, and they are similarly numbered. As with the previous figures, the operator illustratively assesses worksite 126 and identifies exclusion zones where the operator does not wish skid steer loader 100 to enter. In the example shown in FIG. 4, worksite 126 includes a fence 128, a garden 130, a tree 132 and a bush 134. FIG. 4 shows that the operator has sprayed, or placed tape, or other marking material, around objects 128-134 to mark them as exclusion zones. For instance, the operator has marked exclusion zone 136 around fence 128. The operator has marked exclusion zone 138 around garden 130, exclusion zone 140 around the trunk of tree 132, and exclusion zone 142 around bush 134. As the operator is operating skid steer loader 100 to move about worksite 126, backup camera 114 captures images of the worksite and travel control system 170 identifies the various objects that are to be avoided, based upon the exclusion zones defined by the markings placed around them.

Travel control system 170 can store the locations of those exclusion zones, as they are identified, and monitor the location of skid steer loader 100, as it moves about worksite 126. Based upon the dimensions of skid steer loader 100, travel control system 170 can identify when a commanded action for skid steer loader 100 would cause it to intersect with, or infringe on, one of the exclusion zones 136-142. System 170 can then take actions to automatically control loader 100, as is described in greater detail below.

Figure 5:
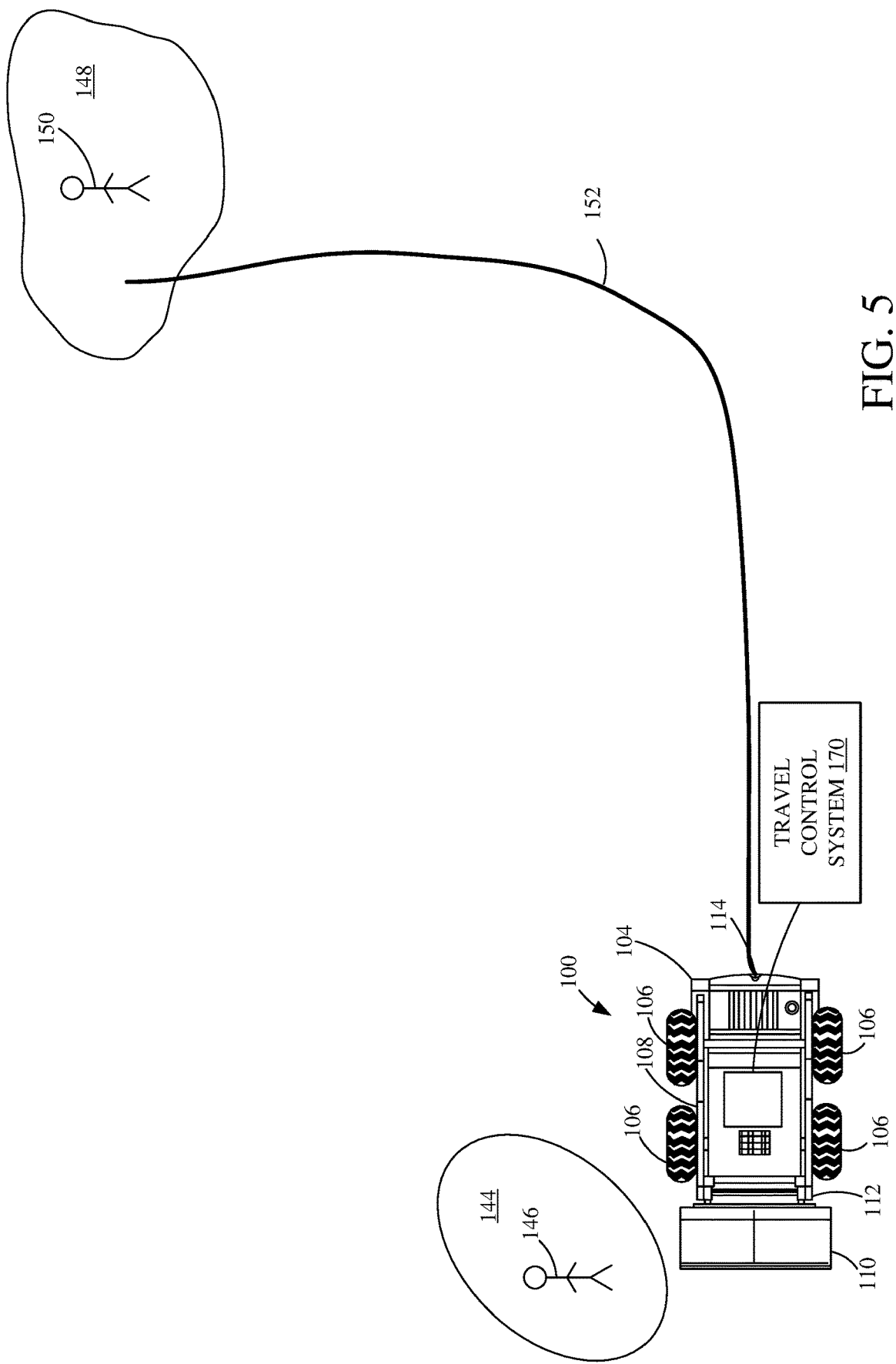
FIG. 5 is a top view of a skid steer loader performing a material conveyance operation.

FIG. 5 shows another example, in which skid steer loader 100 is used to transport material between a first work location 144, where a first worker 146 is working, and a second work location 148 where a second worker 150 is working. Some items on skid steer loader 100 are similar to those shown in previous figures, and they are similarly numbered.

In the work operation being performed in FIG. 5, it is common that material must often be transported between work locations 144 and 148. Therefore, in one example, an operator marks a material transport route 152 with tape, paint, or other marking material. Thus, when one of the workers 146 or 150 wishes to convey material from one work location 144 to the other work location 148, the worker can actuate an automated transport mode in which skid steer loader 100 automatically follows the material conveyance route 152 to move between the two work locations 144 and 148.

Figure 6:
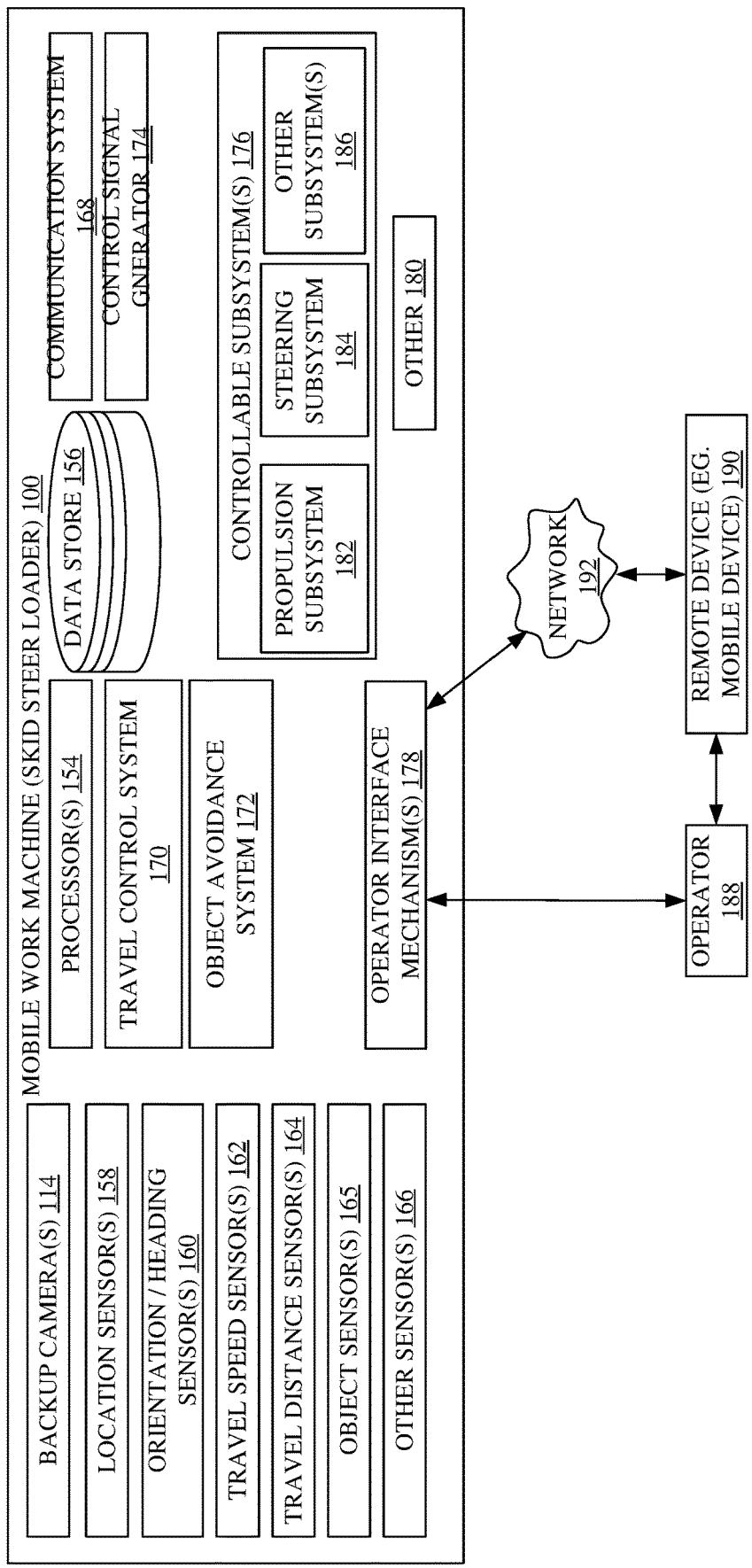
FIG. 6 is a block diagram showing one example of the skid steer loader illustrated in previous figures, in more detail.

FIG. 6 is a block diagram showing loader 100 in more detail. Some things shown in FIG. 6 are similar to those shown in the earlier figures, and they are similarly numbered. FIG. 6 also shows that skid steer loader 100 illustratively includes one or more processors 154, data store 156, location sensor 158, orientation/heading sensor 160, travel speed sensor 162, travel distance sensor 164, object sensor 165, and it can include a wide variety of other sensors 166.

Loader 100 also includes communication system 168, travel control system 170, object avoidance system 172, control signal generator 174, a plurality of controllable subsystems 176, operator interface mechanisms 178, and it can include a wide variety of other items 180. Controllable subsystems 176 can include propulsion system 182, steering subsystem 184, and it can include a wide variety of other controllable work machine actuators and subsystems 186.

FIG. 6 also shows that an operator 188 can interact with operator interface mechanisms 178 in order to control and manipulate machine 100. Operator interface mechanisms 178 can thus include levers, joysticks, buttons, linkages, a steering wheel, pedals, a display screen that can display actuatable mechanisms, such as icons, buttons, etc., as well as a microphone and speaker (where speech recognition and/or speech synthesis are provided), and a wide variety of other audio, visual, haptic, mechanical and other items.

FIG. 6 also shows that, in one example, operator 188 can use a remote device 190 (such as a mobile device) to interact with machine 100 over network 192. Thus, network 192 can include a wide area network, a local area network, a near field communication network, a cellular communication network, or any of a wide variety of other networks or combinations of networks. FIG. 6 thus shows that operator 188 can be a local operator who controls loader 100 from the operator compartment 102, by directly interacting with operator interface mechanisms 178. Similarly, operator 188 can be a remote operator that is not local to machine 100, but is instead located remotely, outside of operator compartment 102, in which case operator 188 can use remote device 190 to manipulate and control machine 100, instead.

Before describing the overall operation of machine 100 in more detail, a brief description of some of the items in machine 100, and their operation, will first be described. Location sensor 158 illustratively generates a location of machine 100 in a local or global coordinate system. It can, for instance, be a GPS receiver or another satellite-based sensor, or another type of location sensor. Orientation/heading sensor 160 illustratively generates an output indicative of a sensed orientation of machine 100 and/or a heading of machine 100. Sensors 160 can be one or more inertial measurement units, accelerometers, or other sensors. The sensors can also generate a signal indicative of the orientation and heading based on data from location sensor 158. For instance, as the location of the machine 100 changes, and as this is indicated by the sensor signals from location sensor 158, the heading of the machine can be derived from that information.

Travel speed sensor 162 senses the travel speed of machine 100. This can be done by sensing the rotation speed of an axel or a wheel, based upon the changes in position of machine 100 (as indicated by the signals from location sensor 158) over time, or by using any other type of speed sensor that provides an indication of the ground speed or travel speed of machine 100.

Travel distance sensor 164 illustratively senses the distance of travel of machine 100. Again, this can be a separate sensor, or the travel distance can be derived from changes in the location of machine 100 based on the location signals generated by location sensor 158.

Object sensors 165 can be any of a wide variety of different types of sensors that may sense objects in a vicinity of loader 100 (e.g., objects that loader 100 is in danger of colliding with). Thus, sensors 165 can include one or more cameras (including backup cameras 114), RADAR-based sensors, LIDAR-based sensors, various other vision-based sensors, mechanical sensors, ultrasonic sensors, among others. In one example, sensors 165 generate a signal indicating the presence of an object and also its distance and/or location relative to machine 100.

Communication system 168 illustratively facilitates communication among the items in machine 100, and also facilitates communication of the items in machine 100 with remote device 190 over network 192. Therefore, the configuration of communication system 168 may depend on the type of communication that it is to facilitate.

Travel control system 170 illustratively receives sensor signals from some or all of sensors 114 and 158-166. It can also receive one or more inputs from operator 188 through operator interface mechanisms 178. Thus, operator 188 can set a mode of control that travel control system 170 is to implement. This is described in greater detail below. By way of brief example, the mode may be a line following mode in which loader 100 follows one of the lines or routes described above with respect to FIGS. 2, 3, and 5. The mode may be an exclusion zone mode in which case loader 100 is automatically controlled to avoid infringing on any exclusion zones, such as those shown in FIG. 4. Other modes are described below.

Based upon the sensor signals (which may identify the location of the line or route of travel for machine 100 or exclusion zones), travel control system 170 provides outputs to control signal generator 174. Control signal generator 174 generates control signals to control the controllable subsystems 176 in order to automatically execute the mode of operation being implemented by travel control system 170. By automatically, it is meant, for example, that the operation is performed without further human involvement, except perhaps to initiate or authorize the operation.

For instance, if the mode selected by the operator is a line following mode, then travel control system 170 generates outputs to control signal generator 174 indicating how control signal generator 174 should control the propulsion subsystem 182 and steering subsystem 184 to automatically keep loader 100 following the line marked by the operator. The operation of travel control system 170 is described in greater detail below.

Control signal generator 174 can also receive inputs from operator interface mechanisms 178 indicating control inputs that are being provided by operator 188. Control signal generator 174 can then generate control signals to control the controllable subsystems 176 based on those inputs as well. Similarly, control signal generator 174 can receive inputs from the various sensors 114 and 158-166 and generate control signals based on those inputs. Control signal generator 174 can receive inputs from a control algorithm that is run by processor 154, or from object avoidance system 172, or based on other inputs as well.

Object avoidance system 172 can receive an input from object sensors 165. Based on those sensor inputs, object avoidance system 172 can generate outputs to control signal generator 174 so that control signal generator 174 generates control signals to control the controllable subsystems 176 so that machine 100 does not collide with any sensed objects.

Figure 7:
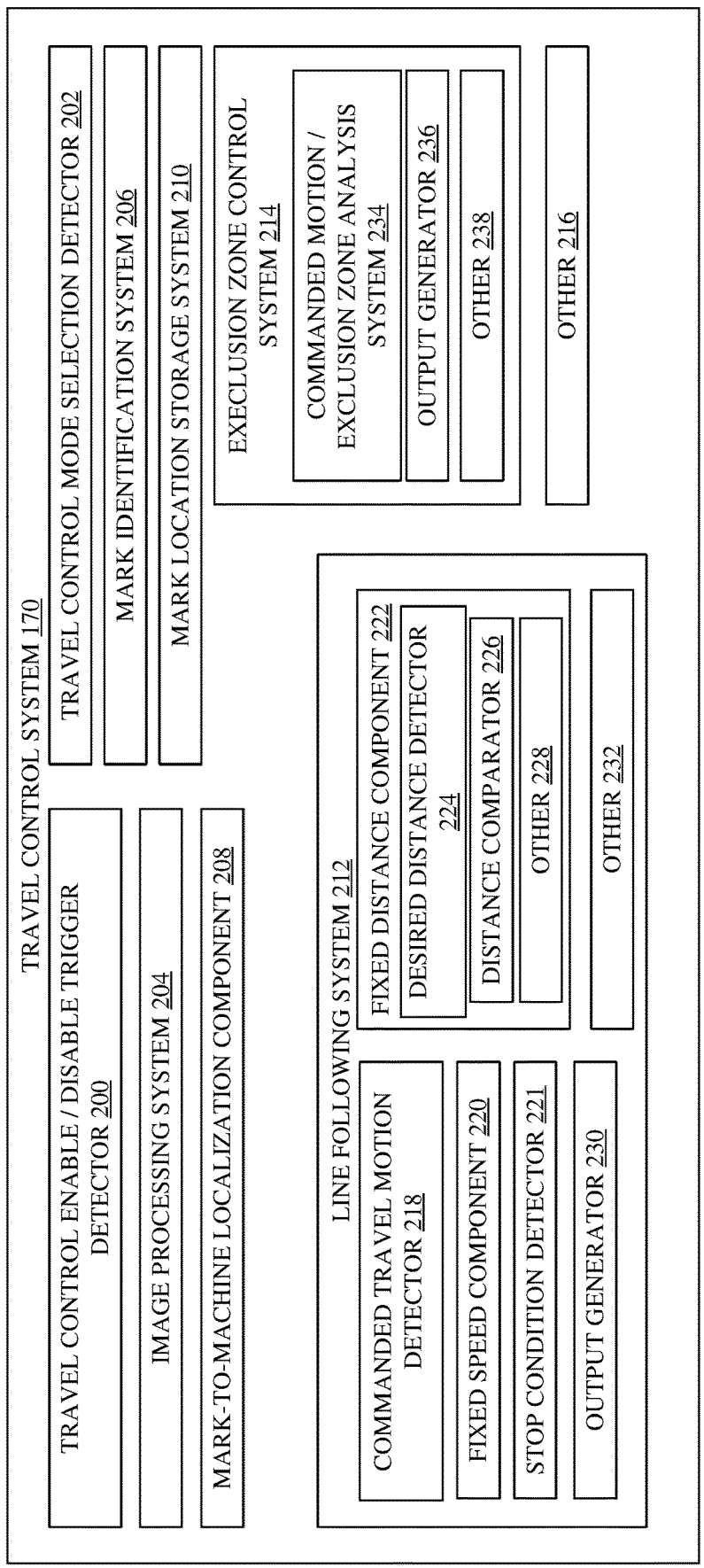
FIG. 7 is a block diagram showing one example of a travel control system, in more detail.

FIG. 7 is a block diagram, showing one example of travel control system 170, in more detail. Travel control system 170 illustratively includes travel control enable/disable trigger detector 200, travel control mode selection detector 202, image processing system 204, mark identification system 206, mark-to-machine localization component 208, mark location storage system 210, line following system 212, exclusion zone control system 214, and it can include a wide variety of other items 216. Line following system 212 illustratively includes commanded travel motion detector 218, fixed speed component 220, stop condition detector 221, fixed distance component 222 (which, itself, includes desired distance detector 224, distance comparator 226, and it can include other items 228), output generator 230, and it can include other items 232. Exclusion zone control system 214, itself, illustratively includes commanded motion/exclusion zone analysis system 234, output generator 236, and it can include other items 238. Before describing the overall operation of travel control system 170 in more detail, a brief description of some of the items in system 170, and their operation, will first be provided.

Travel control enable/disable trigger detector 200 detects when travel control system 170 is enabled or disabled. This can be detected based on a variety of different criteria, such as an input from operator 188, an input from a control algorithm, or other inputs. Travel control mode selection detector 202 detects a mode selection input indicating the type of travel control mode that system 170 is to execute. For instance, the mode may a line following mode, in which travel control system 170 automatically controls the navigation of machine 100 to follow a line. It may also be an exclusion zone mode in which system 170 automatically controls machine 100 to avoid infringing on exclusion zones. Other modes can be selected as well, and some are described in more detail below.

Image processing system 204 illustratively receives image data indicative of images captured by backup camera 114. System 204 processes those images so that mark identification system 206 can determine whether any of the predetermined markings are in the images. For instance, if the operator used tape or paint as the marking medium (or marking material) to mark a travel route for machine 100, then mark identification system 206 identifies those items in the processed images. The marking medium may have predefined visual or optical characteristics so it can be more easily identified by image processing system 204 and mark identification system 206. For instance, it may be tape or paint that has a color in a predefined color spectrum range. It may have other predefined optical properties so that it can be easily identified as well.

Once a mark has been identified, then mark-to-machine localization component 208 localizes the mark, and its orientation, to machine 100. In doing so, component 208 can access machine dimension data as well as camera mounting data. This data identifies the dimensions of machine 100 and the position where backup camera 114 is mounted on machine 100. Using this information, as well as the location of the identified mark in the captured image, mark-to-machine localization component 202 localizes the orientation and location of the mark relative to the orientation and location of machine 100. For instance, if the mark is a line, then system 208 can determine whether the line is centrally located along the longitudinal axis of machine 100 so that machine 100 is properly aligned to begin following that line. When the mark is an exclusion zone, then component 208 identifies where, relative to the position and orientation of machine 100, the exclusion zone is located.

Mark location storage system 210 illustratively interacts with data store 156 (in FIG. 6) to store the locations of various marks. For instance, when marks are identified on a worksite as exclusion zones, the marks may subsequently get covered by dust, or other debris. In that case, even though mark dentification system 206 is not able to identify the mark in a near real time image captured by backup camera 114, mark-to-machine localization component 208 can still localize the location of the mark relative to machine 100, as machine 100 moves about the worksite, based upon the location data, corresponding to that mark, that is stored.

Line following system 212 illustratively controls machine 100 in a line following mode, so that it follows a line marked by the operator. Thus, when enable/disable trigger detector 200 detects that travel control system 170 is enabled, and when travel control mode selection detector 202 detects that the selected mode is a line following mode, then line following system 212 performs control operations to control machine 100.

Commanded travel motion detector 218 detects when the operator 118 is providing an input commanding travel motion of machine 100. The travel motion, when line following is to be performed, is an input indicating that machine 100 is to begin traveling to follow the marked line.

The line following can be performed according to two or more different modes as well. For instance, in a fixed speed mode, once the operator provides an input commanding travel motion of machine 100, then fixed speed component 220 generates control signals that are output by output generator 230 to control signal generator 174. In response, control signal generator 174 controls machine 100 to follow the line at a fixed speed until a stop condition is detected by stop condition detector 221. For instance, machine 100 may reach the end of the marked line, an operator may override the system to stop machine motion, an object may be detected by object detection system 172, etc. Once a stop condition is detected, then a signal indicative of this is provided to output generator 230 which controls control signal generator 174 to generate control signals to stop the machine motion.

Line following can also be performed in a fixed distance mode. For instance, as illustrated in FIG. 3, machine 100 may be used to drill post holes. In that case, the post holes may desirably be drilled at a predetermined fixed spacing relative to one another. Thus, desired distance detector 224 detects an input indicating the desired distance or linear interval that machine 100 is supposed to travel between stoppages so the post holes are spaced as desired. This may be provided by an operator input, by a previously stored input, or in other ways. Distance comparator 226 then receives the travel distance sensor signal from sensor 164 (shown in FIG. 6) to determine when machine 100 has traveled the desired distance. When it has, it provides an output to stop condition detector 221 indicating that a stop condition has been reached (e.g., machine 100 has traveled the desired distance interval for the next post hole to be drilled).

When operator 188 has selected exclusion zone control mode, this is detected by travel control mode selection detector 202 and a signal indicative of this is provided to exclusion zone control system 214. Commanded motion/exclusion zone analysis system 234 receives a commanded motion input indicative of the travel motion that operator 188 is commanding the machine to perform. It then analyzes the effect of that command relative to the location of any exclusion zones that have been identified by mark identification system 206, or that have been previously stored by mark location storage system 210. Commanded motion/exclusion zone analysis system 234 then determines whether the commanded motion will result in machine 100 impinging upon any exclusion zones. It can do this by accessing the machine dimensions to determine whether the periphery of the machine may impinge on any of the exclusion zones, which have been localized to machine 100 by mark-to-machine localization component 208. If not, then system 234 outputs a signal indicative of this to output generator 236 which indicates to control signal generator 174 that the commanded motion can proceed. However, if commanded motion/exclusion zone analysis system 234 does determine that the commanded motion will likely cause machine 100 to impinge upon an exclusion zone, then it provides an output signal indicative of this to output generator 236. Output generator 236 then controls control signal generator 174 to control controllable subsystems 176 so that the machine does not encroach or impinge upon any of the exclusion zones. This may be by stopping the machine, by slowing the machine down and generating an operator alert, by simply alerting the operator but allowing the operator to override the alert, or in other ways.

Figure 8A:
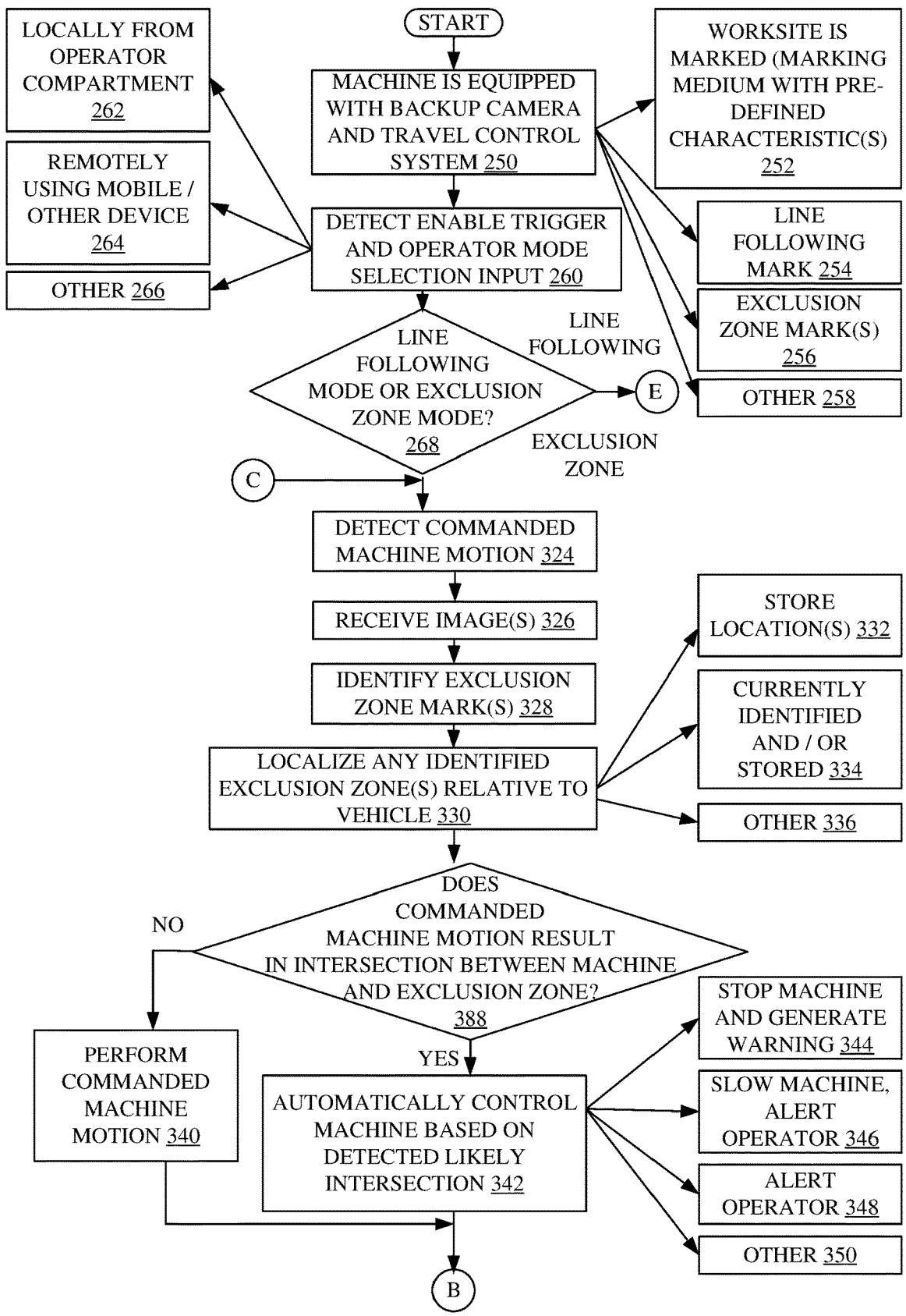
FIGS. 8A, 8B and 8C (collectively referred to herein as FIG. 8) show one example of a flow diagram illustrating the operation of the travel control system, in more detail.
Figure 8B:
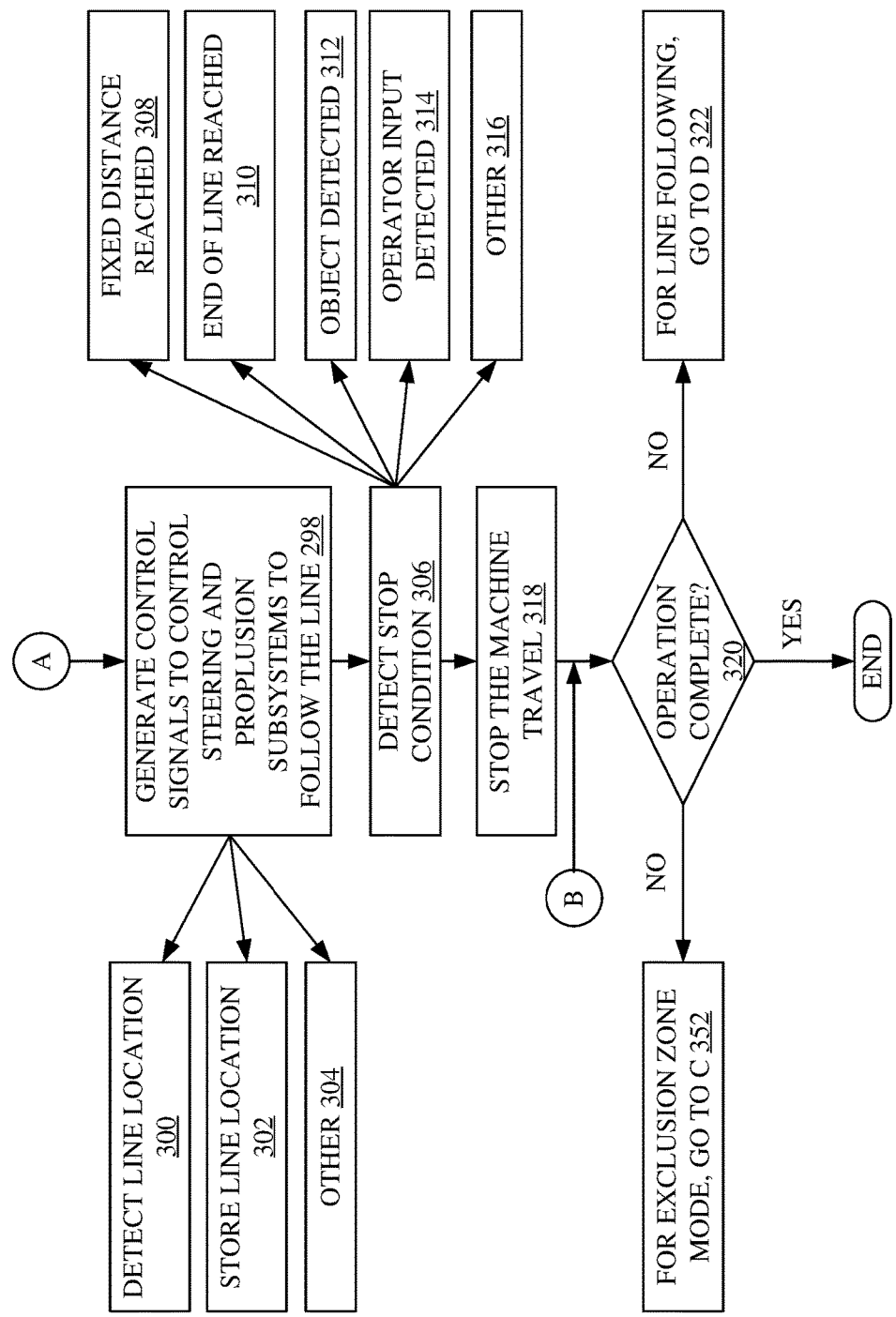
Figure 8C:
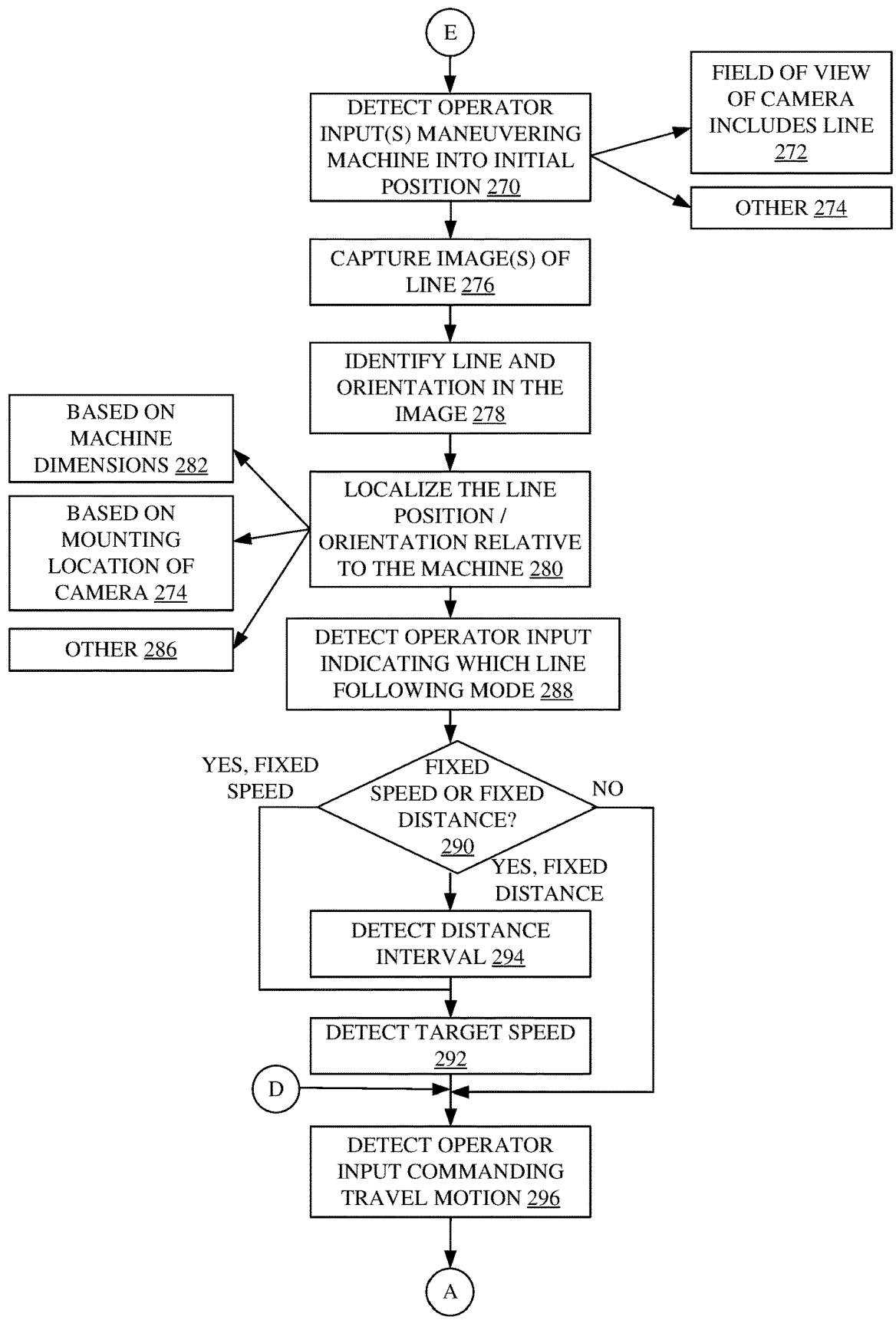

FIGS. 8A, 8B and 8C (collectively referred to herein as FIG. 8) show a flow diagram illustrating one example of the operation of travel control system 170, in automatically controlling machine 100 based upon a selected travel control mode. It is first assumed that machine 100 is equipped with a backup camera 114, or another image capture device that captures images to the rear of machine 100. It is also assumed that machine 100 is equipped with one example of the travel control system 170. This is indicated by block 250 in the flow diagram of FIG. 8. Also, at some point, it is assumed that operator 188 has marked the worksite with a marking medium (or marking material) that has pre-defined characteristics that image processing system 204 and mark identification system 206 can look for to identify it. Marking the worksite with the marking medium is indicated by block 252 in the flow diagram of FIG. 8.

The marking can take any of a wide variety of different forms. It can be a line following mark 254, in a scenario where the operator wishes travel control system 170 to operate in a line following control mode. The marks can be exclusion zone marks 256 in a scenario where the operator wishes travel control system 170 to operate in an exclusion zone control mode. The marks can take other forms as well, and this is indicated by block 258.

Travel control enable/disable trigger detector 200 then detects an enable trigger indicating that operator 188 wishes to enable the travel control system 170 to automatically control certain operations of machine 100. Travel control mode selection detector 202 then detects a mode selection input from operator 188 indicating the type of control mode that the operator wishes travel control system 170 to perform. The modes can include such things as a line following mode (with either fixed speed or fixed distance) exclusion zone control mode, among others. Detecting the enable trigger and the operator mode selection input is indicated by block 260.

The operator 188 can reside in the operator compartment and locally interact with operator interface mechanisms 178. This is indicated by block 262. The operator can also control machine 100 remotely, such as using a mobile or other device 190. This is indicated by block 264 in the flow diagram of FIG. 8. The enable trigger input and operator mode selection input can be detected in other ways as well, and this is indicated by block 266.

In one example, based on the inputs, it is first determined whether the selected operating mode is a line following mode or an exclusion zone mode. This is detected by travel control mode selection detector 202, and is indicated by block 268 in the flow diagram of FIG. 8.

If, at block 268, travel control mode selection detector 202 detects that operator 188 has selected a line following mode (which may be used, for instance, in trenching, fence building, etc.) then operator interface mechanisms 178 detect machine control operator inputs maneuvering machine 100 into an initial position relative to the line marked for line following. Control signal generator 174 then controls the controllable subsystems 176 to move machine 100 into that position based on the machine control inputs. Detecting the operator inputs and maneuvering the machine into the initial position is indicated by block 270. In one example, the initial position is such that the field of view of the camera 114 includes at least a portion of the line. This is indicated by block 272. In another example, it may be that machine 100 has its longitudinal axis aligned with the line, or is in another initial position. This is indicated by block 274.

Once in the initial position, backup camera 114 captures images which include the line. This is indicated by block 276. Image processing system 204 processes the images so that mark identification system 206 can identify the line in the captured images. Mark identification system 206 also illustratively identifies the orientation of the line, such as the direction of its longitudinal axis, etc. Identifying the line and the orientation in the image is indicated by block 278.

Mark-to-machine localization component 208 then localizes the line position and orientation relative to the position and orientation of machine 100. This is indicated by block 280. In one example, component 208 accesses machine dimensions and an indication of the mounting location of backup camera 114. It then calculates the relative position and orientation of the line based upon the position and orientation of the machine frame. Calculating the position and orientation of the line relative to the machine based upon machine dimensions is indicated by block 282. Calculating it based upon the mounting location of the camera 114 is indicated by block 284. The position and orientation of the line relative to the machine can be calculated in a wide variety of other ways as well, and this is indicated by block 286.

At some point, travel control mode selection detector 202 also detects an operator input indicating whether the line following mode is to be a fixed speed control mode or a fixed distance control mode. This is indicated by block 288. For instance, if the operator is performing a trenching operation, then the operator may select the fixed speed mode where, upon sensing a machine travel command, machine 100 automatically follows the line at a fixed speed until a stop condition is detected. If the operator is performing a fence building mode, then the operator may select the fixed distance mode where, with each machine travel command, the machine automatically follows the line for a fixed distance before stopping.

If it is determined that the operator has selected the fixed speed mode, at block 290, then fixed speed component 220 in line following system 212 (shown in FIG. 7) detects the fixed speed setting indicative of the fixed target speed at which operator 188 desires machine 100 to move, during line following. Detecting the target speed is indicated by block 292.

If, at block 290 it is determined that the operator has selected the fixed distance mode, then desired distance detector 224 detects an operator input indicating the distance that machine 100 is to travel with each travel command input. This is indicated by block 294. Fixed distance component 222 may also detect an input speed indicating the desired speed that operator 188 wishes the machine to travel, during each fixed distance increment, when following the line. Detecting the target speed is again indicated by block 292 in the flow diagram of FIG. 8.

At some point, a machine travel command input commanding machine 100 to begin traveling along the line, is detected. This is detected by commanded travel motion detector 218. This may be based on a signal from operator interface mechanisms 178, or based on other inputs. Detecting the machine travel command input commanding travel is indicated by block 296 in the flow diagram of FIG. 8.

Fixed speed component 220 then generates an indication of the fixed speed at which machine 100 is to move, to output generator 230 which generates an output to control the control signal generator 174. Control signal generator 174 then generates control signals to control propulsion system 182 and steering system 184 so that machine 100 automatically follows the line marking at the desired target speed. Generating the control signals to control steering and propulsion subsystems 184 and 182, respectively, to follow the line is indicated by block 298. In doing so, image processing system 204 and mark identification 206 continue to capture images of the area behind machine 100 and to identify the line in those images. Mark-to-machine localization component 208 continues to localize the orientation and position of the line relative to machine 100. Mark location storage system 210 stores the location and orientation of the line as well. Continually detecting the line location and localizing it to machine 100 is indicated by block 300. Storing that information is indicated by block 302. Generating control signals to control the steering and propulsion subsystems to follow the line can be done in other ways as well, and this is indicated by block 304.

Line following system 212 continues to control machine 100 to follow the line until a stop condition is detected. This is indicated by block 306. For instance, if operating in the fixed distance mode, distance comparator 226 compares the distance that has been traveled by machine 100 to the fixed distance increment and detects when machine 100 has traveled the fixed distance increment. This is a stopping condition and is indicated by block 308. In that case, line following system 212 generates an output stopping the travel motion of machine 100. In another example, it may be that fixed speed component 220 detects that machine 100 has reached the end of the line marking. This is another stopping condition and is indicated by block 310. In that case, stop condition detector 221 detects this and output generator 230 generates an output, again stopping the travel motion of the machine 100.

In yet another example, it may be that object avoidance system 172 detects an object in the travel path of machine 100, as it is following the line. Object avoidance system 172 may thus provide an input to stop condition detector 221, to stop the motion of machine 100 as well. In another example, object avoidance system 172 can provide a signal directly to control signal generator 174, overriding the signals generated by line following system 212, in order to stop travel motion of machine 100. Detecting a stop condition based upon a signal from object avoidance system 172 is indicated by block 312 in the flow diagram of FIG. 8. In yet another example, it may be that operator 188 wishes to stop the travel motion of machine 100. Thus, the operator can provide an input through one of operator interface mechanisms 178. This can be detected by stop condition detector 221 to stop the travel motion of machine 100, or the signal can be provided directly to control signal generator 174 to override the signals generated by line following system 212, and thus stop the travel motion of machine 100. Stopping the machine 100 based upon an operator input is indicated by block 314. The stop conditions can be detected in other ways as well, and this is indicated by block 316. Generating a signal to control signal generator 174 to stop the travel motion of the machine based on a detected stop condition is indicated by block 318.

Unless the operation is complete, as indicated by block 320, then, when travel control system 170 is in the line following mode, processing reverts to block 296 where the commanded travel motion detector 218 awaits another input from operator 188 commanding machine travel. Continuing operation at block 296 is indicated by block 322 in the flow diagram of FIG. 8.

Returning again to block 268, assume that travel control mode selection detector 202 has detected an operator input indicating that travel control system 170 is to operate in the exclusion zone control mode. This was described above with respect to FIG. 4. Assume that the operator has already placed markings at the worksite to identify the various exclusion zones that are to be avoided by machine 100. At some point, operator 188 will provide an operator input commanding machine motion. This may be machine travel, movement of the machine attachment, etc. The commanded motion is detected by exclusion zone control system 214, as indicated by block 324 in the flow diagram of FIG. 8. Again, image processing system 204 receives images from backup camera 114, and mark identification system 206 identifies the exclusion zones, based upon the markings identified in the images. Receiving the images is indicated by block 326 and identifying the exclusion zone markings is indicated by block 328.

Mark-to-machine localization component 208 then localizes any identified exclusion zones relative to machine 100. For instance, it can identify the location (e.g., distance, direction) of any exclusion zones relative to machine 100. Localizing the exclusion zones to the machine is indicated by block 330 in the flow diagram of FIG. 8.

Mark location storage system 210 can also store a geographic location, orientation, size, etc. of the identified exclusion zones. This is indicated by block 332. Mark-to-machine localization component 208 can localize newly identified exclusion zones (which are just identified based upon the incoming images) and/or it can localize other exclusion zones, that were previously identified, as machine 100 moves about. By localizing previously stored exclusion zones, machine 100 can avoid those exclusion zones, even if the markings have been covered by dust or other debris at the worksite.

For instance, if an exclusion zone was previously identified, and machine 100 has now changed its orientation and/or geographic location, then component 208 can re-localize that exclusion zone relative to machine 100 to identify the distance and direction that the exclusion zone is from machine 100, given the new location of machine 100. Localizing exclusion zones to the machine for currently identified and/or stored exclusion zones is indicated by block 334. The localization can be performed in a wide variety of other ways as well, and this is indicated by block 336.

Commanded motion/exclusion zone analysis system 234 then analyzes the commanded motion against the localized exclusion zones to determine whether the commanded machine motion will result in an intersection of any part of the machine 100 with an exclusion zone. This is indicated by block 338. In one example, analysis system 234 accesses the machine dimensional and dynamics data which indicates the size and other various dimensions of machine 100, and how the periphery of the machine 100 changes in response to different commanded motions. For example, if the commanded motion is to travel forward or turn, then analysis system 234 will identifies how the periphery of the machine 100 changes in local or global coordinates and compare those against the boundaries of the exclusion zones that it have been localized to machine 100. Analysis system 234 determines whether the two intersect. The same can be done with respect to commanded movement of the attachment (e.g., raising, lowering, turning, tilting, etc.). System 234 can determine whether the attachment will intersect any exclusion zones.

If analysis system 234 determines that the commanded motion will not result in an intersection between any part of machine 100 and an exclusion zone, then system 234 provides an indication of this to output generator 236 which, in turn, generates an output to control signal generator 174 permitting the commanded machine motion to be performed. This is indicated by block 340.

If, at block 338, analysis system 234 determines that the commanded motion will result in an intersection between some part of machine 100 and an exclusion zone, then system 234 provides an output indicative of this to output generator 236 which generates an output to control signal generator 174 to automatically control machine 100 based upon the detected, likely intersection. This is indicated by block 342 in the flow diagram of FIG. 8.

The automated control based on a likely intersection of machine 100 with an exclusion zone can take a number of different forms. For instance, in response to such an output signal, control signal generator 174 can generate a control signal to controllable subsystems 176 automatically stopping the machine 100 from performing the commanded motion, and generating a warning for operator 188 on operator interface mechanisms 178. Stopping the machine and generating a warning is indicated by block 344 in the flow diagram of FIG. 8.

In another example, exclusion zone control system 214 can control the control signal generator 174 to slow down the machine and alert the operator that an intersection is likely. This is indicated by block 346. In another example, exclusion zone control system 214 can control the control signal generator 174 to simply generate an operator alert, alerting operator 188 of the likely intersection, without interfering with the commanded control of the machine 100. This is indicated by block 348. The automatic control of machine 100 based upon a detected, likely intersection with an exclusion zone can be done in a wide variety of other ways as well, and this is indicted by block 350.

Unless the operation is complete, as indicated by block 320, then for exclusion zone mode control, processing reverts to block 324 where exclusion zone control system 214 waits for another command input commanding machine motion. Returning to block 324 is indicted by block 352 in the flow diagram of FIG. 8.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
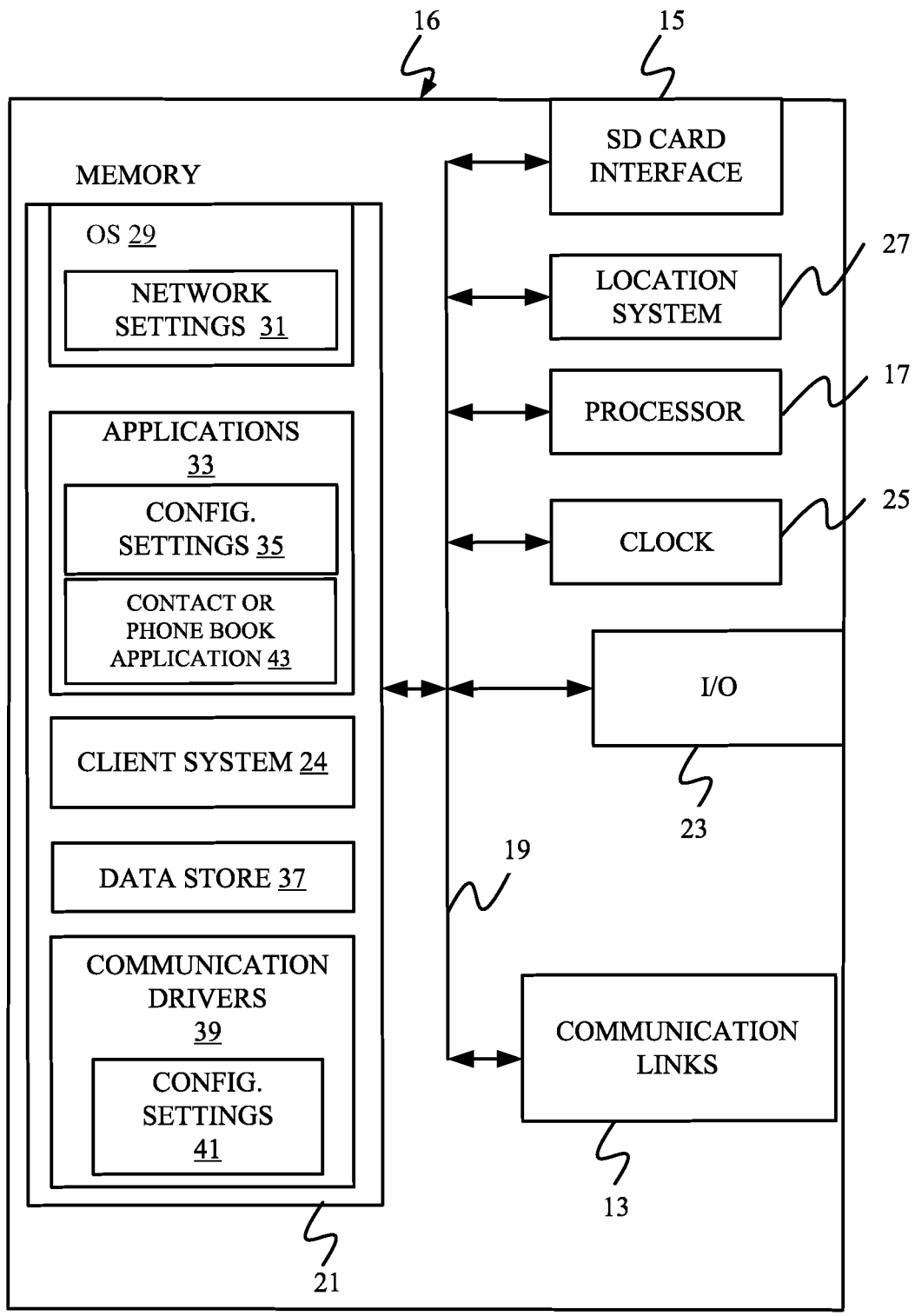
FIGS. 9-11 show examples of mobile devices that can be used in controlling a mobile machine.
Figure 10:
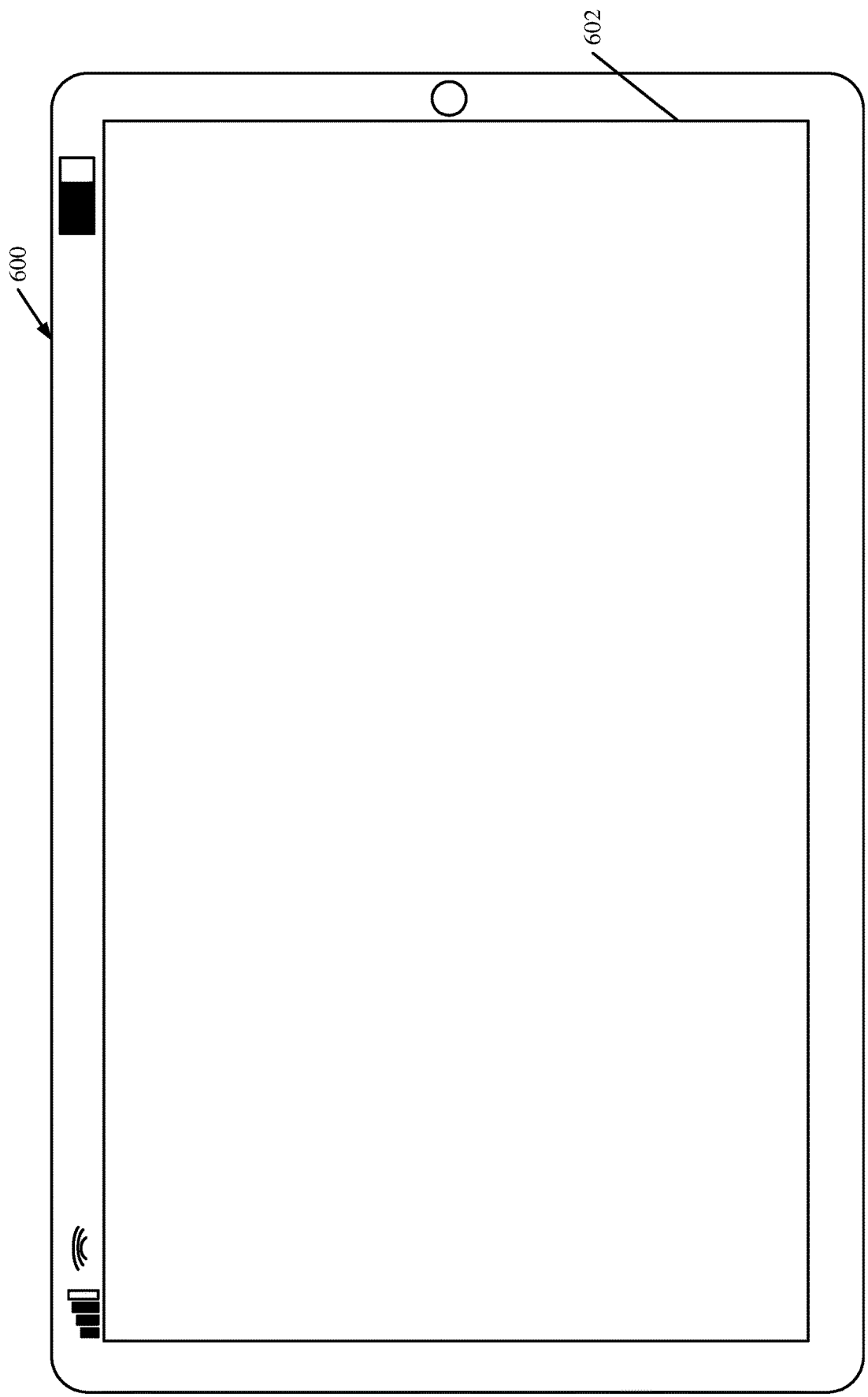
Figure 11:
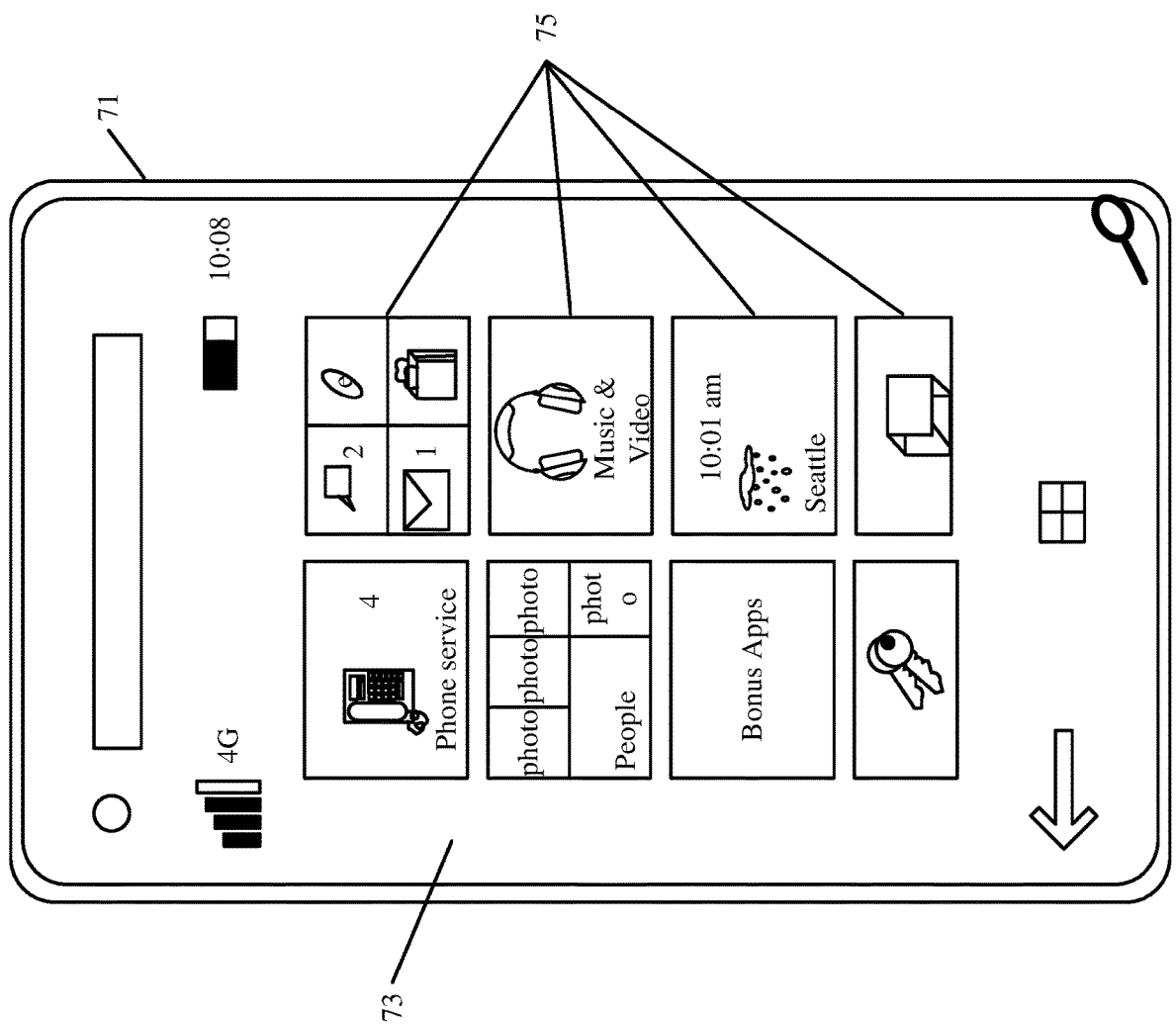

FIG. 9 is a simplified block diagram of one illustrative example of a handheld or mobile computing device that can be used as a user's or client's hand held device 16, in which the present system (or parts of it) can be deployed. For instance, a mobile device can be deployed as remote device 190 or in the operator compartment of machine 100 for use in generating, processing, or displaying the information and/or receiving operator inputs. FIGS. 10-11 are examples of handheld or mobile devices.

FIG. 9 provides a general block diagram of the components of a client device 16 that can run some components shown in previous FIGS., that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
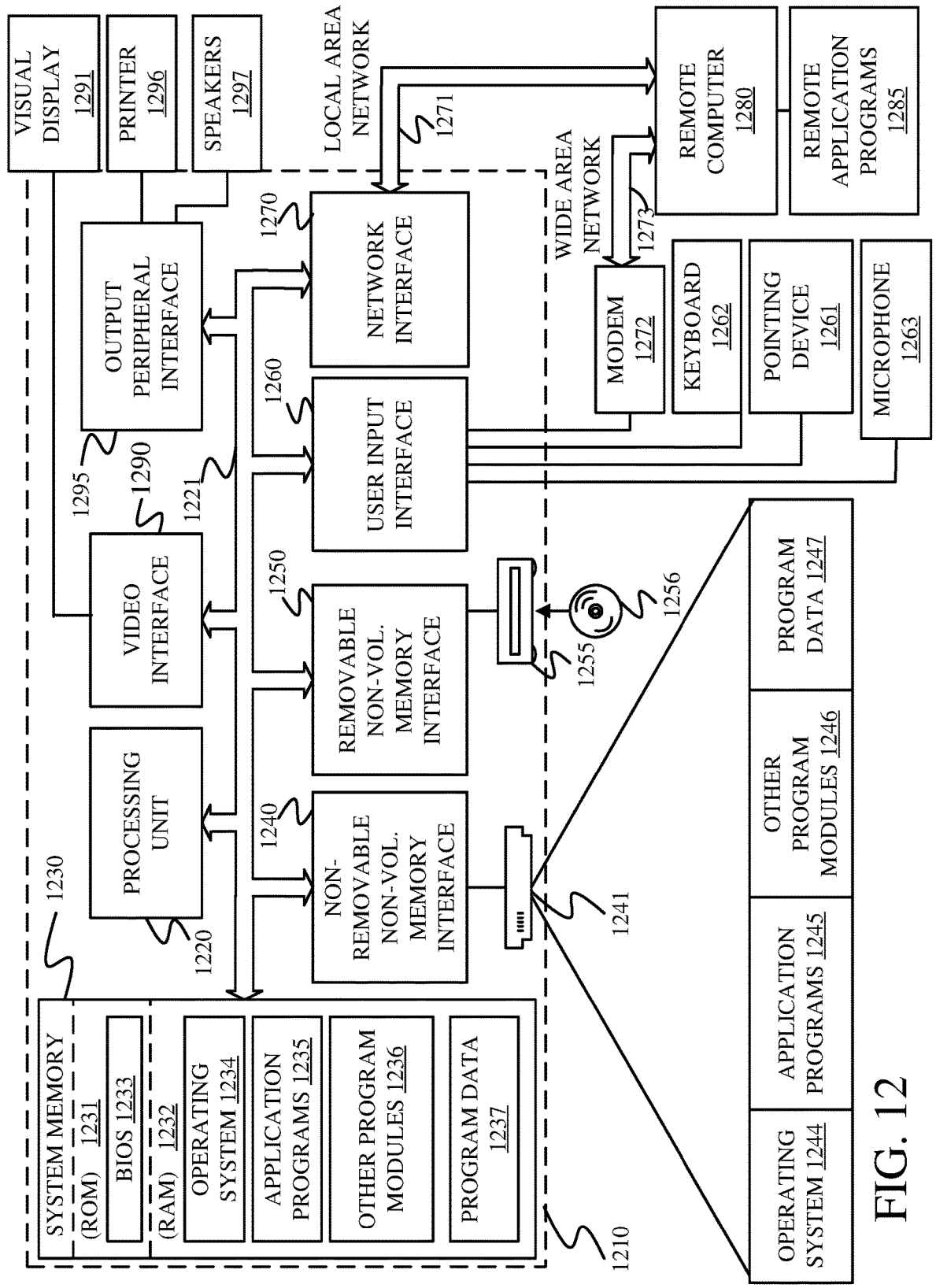
FIG. 12 is a block diagram showing one example of a computing environment that can be used in the machines and systems illustrated in previous figures.

FIG. 12 is one example of a computing environment in which elements of previous FIGS., or parts of them, (for example) can be deployed. With reference to FIG. 12, an example system for implementing some embodiments includes a general-purpose computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer implemented method of controlling a mobile work machine, comprising:
  detecting an attachment control operator input;
  controlling operation of an attachment on the mobile work machine based on the detected attachment control operator input;
  capturing an image of a worksite from a backup camera on the mobile work machine;
  identifying an operator-generated marking, having a predefined characteristic, in the image;
  localizing the predefined operator-generated marking to the mobile work machine; and
  while controlling operation of the attachment on the mobile work machine based on the detected attachment control operator input, automatically controlling machine travel of the mobile work machine based on the localized, operator-generated marking.

Example 2 is the computer implemented method of any or all previous examples wherein identifying an operator-generated marking comprises:
  identifying a route line indicating a desired travel route of the mobile work machine.

Example 3 is the computer implemented method of any or all previous examples wherein automatically controlling machine travel comprises:
  detecting a travel command input commanding the mobile work machine to travel; and
  controlling a propulsion subsystem and a steering subsystem on the mobile work machine so the mobile work machine travels along the desired travel route indicated by the route line.

Example 4 is the computer implemented method of any or all previous examples wherein controlling the propulsion subsystem and the steering subsystem comprises:
  detecting a target speed; and
  controlling the propulsion subsystem and the steering subsystem on the mobile work machine so the mobile work machine travels along the desired travel route until a stop condition is detected.

Example 5 is the computer implemented method of any or all previous examples wherein controlling the propulsion subsystem and the steering subsystem on the mobile work machine comprises:
  detecting the stop condition; and
  automatically stopping travel motion of the mobile work machine based on the detected stop condition.

Example 6 is the computer implemented method of any or all previous examples wherein detecting a stop condition comprises:
  detecting that the mobile work machine has reached an end of the route line.

Example 7 is the computer implemented method of any or all previous examples wherein controlling the propulsion subsystem and the steering subsystem comprises:
  detecting a desired distance interval; and
  controlling the propulsion subsystem and the steering subsystem on the mobile work machine so the mobile work machine travels along the desired travel route for the desired distance interval.

Example 8 is the computer implemented method of any or all previous examples wherein controlling the propulsion subsystem and the steering subsystem on the mobile work machine so the mobile work machine travels along the desired travel route for the desired distance interval comprises:
  detecting that the mobile work machine has travelled along the travel route for the desired distance interval; and
  stopping travel motion of the mobile work machine.

Example 9 is the computer implemented method of any or all previous examples wherein identifying an operator-generated marking comprises:
  identifying an exclusion zone indicating a geographic portion of the worksite that the mobile work machine is to avoid.

Example 10 is the computer implemented method of any or all previous examples wherein automatically controlling machine travel comprises:
  detecting a travel command input commanding the mobile work machine to perform a commanded operation;
  determining whether the commanded operation will cause a periphery of the mobile work machine to intersect with the exclusion zone;
  generating a likely intersection signal indicative of whether the commanded operation will cause a periphery of the mobile work machine to intersect with the exclusion zone; and
  automatically controlling a controllable subsystem of the mobile work machine based on the likely intersection signal.

Example 11 is the computer implemented method of any or all previous examples wherein, when the likely intersection signal indicates that the commanded operation will cause a periphery of the mobile work machine to intersect with the exclusion zone, then automatically controlling a controllable subsystem comprises:
  controlling the controllable subsystem of the mobile work machine to inhibit performance of the commanded operation.

Example 12 is the computer implemented method of any or all previous examples wherein, when the likely intersection signal indicates that the commanded operation will cause a periphery of the mobile work machine to intersect with the exclusion zone, then automatically controlling a controllable subsystem comprises:
  controlling an operator interface mechanism to generate an operator alert.

Example 13 is the computer implemented method of any or all previous examples wherein detecting the attachment control operator input comprises:
  detecting the attachment control operator input from a remote operator.

Example 14 is a mobile work machine, comprising:
  an attachment controlled by an attachment control operator input;
  a backup camera capturing an image of a worksite;

a mark identification system identifying an operator-generated marking, having a predefined characteristic, in the image;

a mark-to-machine localization system localizing the predefined operator-generated marking to the mobile work machine;

a control signal generator generating control signals to control operation of the attachment on the mobile work machine based on the detected attachment control operator input; and a travel control system automatically controlling machine travel of the mobile work machine based on the localized, operator-generated marking.

Example 15 is the mobile work machine of any or all previous examples wherein the mark identification system is configured to identify a route line indicating a desired travel route of the mobile work machine and wherein the travel control system comprises:

a commanded travel motion detector that detects a travel command input commanding the mobile work machine to travel; and a fixed speed component configured to detect a target speed and controlling a propulsion subsystem and a steering subsystem on the mobile work machine so the mobile work machine travels along the desired travel route until at the target speed.

Example 16 is the mobile work machine of any or all previous examples wherein the mark identification system is configured to identify a route line indicating a desired travel route of the mobile work machine and the travel control system comprises:

a desired distance detector detecting a desired distance interval; and a fixed distance component controlling the propulsion subsystem and the steering subsystem on the mobile work machine so the mobile work machine travels along the desired travel route for the desired distance interval.

Example 17 is the mobile work machine of any or all previous examples wherein the fixed distance component comprises:

a distance comparator detecting that the mobile work machine has travelled along the travel route for the desired distance interval; and a stop condition detector generating a stop signal to stop travel motion of the mobile work machine.

Example 18 is the mobile work machine of any or all previous examples wherein the mark identification system is configured to identify an exclusion zone indicating a geographic portion of the worksite that the mobile work machine is to avoid, wherein the travel control system comprises:

a commanded travel motion detector that detects a travel command input commanding the mobile work machine to perform a commanded operation; and a commanded motion/exclusion zone analysis system that determines whether the commanded operation will cause a periphery of the mobile work machine to intersect with the exclusion zone and generate a likely intersection signal indicative of whether the commanded operation will cause a periphery of the mobile work machine to intersect with the exclusion zone, the travel control system being configured to automatically control a controllable subsystem of the mobile work machine based on the likely intersection signal.

Example 19 is a computer implemented method of controlling a mobile work machine, comprising:

capturing an image of a worksite from a backup camera on the mobile work machine;

identifying an operator-generated marking, having a predefined characteristic, in the image, the operator-generated marking identifying a material transport route on the worksite;

localizing the material transport route indicated by the operator-generated markings to the mobile work machine;

detecting a machine travel operator input; and automatically controlling the mobile work machine to travel along the material transport route by continuing to capture images from the backup camera, localizing the material transport route to the mobile work machine, and controlling a steering subsystem and a propulsion subsystem to follow the material transport route.

Example 20 is the computer implemented method of any or all previous examples wherein detecting a machine travel operator input comprises:

detecting the machine travel operator input from a remote device, remote from an operator compartment of the mobile work machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling a mobile work machine comprising: capturing an image, from a backup camera on the mobile work machine, of an operator-generated marking having a predefined characteristic, the operator-generated marking indicative of a desired attachment travel path for an attachment of the mobile work machine; identifying the operator-generated marking in the image captured from the backup camera; localizing the operator-generated marking having the predefined characteristic to the mobile work machine; and automatically controlling travel of the mobile work machine based on the localized, operator-generated marking to align the attachment with the desired attachment travel path indicated by the operator-generated marking.

2. The computer implemented method of claim 1 wherein identifying the operator-generated marking comprises:

identifying, as the operator-generated marking, a marking, on the surface of the worksite, the forms a substantially continuous line on the surface of the worksite.

3. The computer implemented method of claim 1 wherein automatically controlling travel of the mobile work machine comprises:

detecting a travel command input commanding the mobile work machine to travel; and controlling a propulsion subsystem and a steering subsystem on the mobile work machine so the mobile work machine travels along the worksite, in reverse, keeping the attachment aligned with the desired attachment travel path indicated by the operator-generated marking.

4. The computer implemented method of claim 3 wherein controlling the propulsion subsystem and the steering subsystem comprises:

detecting a target speed; and controlling the propulsion subsystem and the steering subsystem on the mobile work machine so the mobile work machine travels along the worksite, in reverse, keeping the attachment aligned with the desired attachment travel path indicated by the operator-generated marking at the target speed until a stop condition is detected.

5. The computer implemented method of claim 4 wherein controlling the propulsion subsystem and the steering subsystem on the mobile work machine comprises:
  detecting the stop condition; and
  automatically stopping travel motion of the mobile work machine based on the detected stop condition.

6. The computer implemented method of claim 5 wherein detecting a stop condition comprises:
  detecting that the mobile work machine has reached an end of the route line.

7. The computer implemented method of claim 3 wherein controlling the propulsion subsystem and the steering subsystem comprises:
  detecting a desired travel distance interval; and
  controlling the propulsion subsystem and the steering subsystem on the mobile work machine so the mobile work machine travels along the worksite, in reverse, keeping the attachment aligned with the desired attachment travel path indicated by the operator-generated marking for the desired travel distance interval.

8. The computer implemented method of claim 7 wherein controlling the propulsion subsystem and the steering subsystem on the mobile work machine so the mobile work machine travels along the worksite, in reverse, keeping the attachment aligned with the desired attachment travel path indicated by the operator-generated marking for the desired travel distance interval comprises:
  detecting that the mobile work machine has travelled along the worksite for the desired distance interval; and
  stopping travel motion of the mobile work machine based upon detecting that the mobile work machine has travelled along the worksite for the desired travel distance interval.

9. The computer-implemented method of claim 8 and further comprising:
  detecting an additional travel command input commanding the mobile work machine to travel;
  based on the additional travel command input, controlling the propulsion subsystem and the steering subsystem so that the mobile work machine travels along the worksite, in reverse, from a location at which travel motion of the mobile work was stopped, for the desired travel distance interval, keeping the attachment aligned with the desired attachment travel path indicated by the operator-generated marking.

10. The computer-implemented method of claim 9 wherein controlling the propulsion subsystem and the steering subsystem so the mobile work machine travels along the worksite, in reverse, from the location at which travel motion of the mobile work was stopped, for the desired travel distance interval, keeping the attachment aligned with the desired attachment travel path indicated by the operator-generated marking comprises:
  detecting that the mobile work machine has travelled along the worksite for the desired distance interval, from the location at which travel motion of the mobile work machine was stopped; and
  stopping travel motion of the mobile work machine based upon detecting that the mobile work machine has travelled along the worksite, from the location at which travel motion of the mobile work machine was stopped, for the desired travel distance interval.

11. The computer implemented method of claim 1 wherein detecting the attachment control operator input comprises:
  detecting the attachment control operator input from a remote operator.

12. A mobile work machine comprising: an attachment coupled to the front of the mobile work machine; a backup camera capturing an image on a worksite of an operator-generated marking that forms a line having a predefined characteristic; a mark identification system identifying the operator-generated marking having the predefined characteristic in the image captured by the backup camera, the operator-generated marking indicative of a desired travel path for the attachment; a mark-to-machine localization system localizing the operator-generated marking having the predefined characteristic to the mobile work machine; and a travel control system automatically controlling travel of the mobile work machine based on the localized, operator-generated marking having the predefined characteristic, to align the attachment with the desired travel path for the attachment, indicated by the operator-generated marking.

13. The mobile work machine of claim 12 wherein the travel control system comprises:
  a commanded travel motion detector that detects a travel command input commanding the mobile work machine to travel in reverse; and
  a fixed speed component configured to detect a target speed and controlling a propulsion subsystem and a steering subsystem on the mobile work machine so the mobile work machine travels along the worksite, in reverse, at the target speed, keeping the attachment aligned with the desired attachment travel path indicated by the operator-generated marking.

14. The mobile work machine of claim 12 wherein the travel control system comprises:
  a desired distance detector detecting a desired travel distance interval; and
  a fixed distance component controlling the propulsion subsystem and the steering subsystem on the mobile work machine so the mobile work machine travels along the worksite, in reverse, keeping the attachment aligned with the desired attachment travel path indicated by the operator-generated marking for the desired distance interval.

15. The mobile work machine of claim 14 wherein the fixed distance component comprises:
  a distance comparator detecting that the mobile work machine has travelled for the desired travel distance interval; and
  a stop condition detector generating a stop signal to stop travel motion of the mobile work machine based on the detection that the mobile work machine has travelled for the desired travel distance interval.

16. The mobile work machine of claim 12 wherein the operator-generated marking having the predefined characteristic comprises a continuous line on the surface of the worksite.

17. The mobile work machine of claim 16 wherein the operator-generated marking having the predefined characteristic comprises a marking material.

18. A computer implemented method of controlling a mobile work machine, comprising:
  capturing, from a backup camera on the mobile work machine, an image of an operator-generated marking, on a worksite, having a predefined characteristic;
  identifying the operator-generated marking in the image captured from the backup camera, the operator-generated marking indicates a desired travel route of the mobile work machine on the worksite;

localizing the operator-generated marking to the mobile work machine;

detecting a machine travel operator input;

detecting a desired travel distance interval; and automatically controlling the mobile work machine to travel along the route indicated by the operator-generated marking for the desired travel distance interval.

19. The computer implemented method of claim 18 wherein automatically controlling the mobile work machine to travel along the route indicated by the operator-generated marking for the desired travel distance interval comprises:

detecting that the mobile work machine has travelled along the desired travel route for the desired travel distance interval; and automatically stopping travel motion of the mobile work machine based on detecting that the mobile work machine has travelled along the desired travel route for the desired travel distance.

20. The computer implemented method of claim 18 wherein detecting a machine travel operator input comprises:

detecting the machine travel operator input from a remote device, remote from an operator compartment of the mobile work machine.

* * * * *